Aug. 7, 1951  N. GRUBELIC  2,563,601
FLUID MEASURING DEVICE
Filed July 21, 1945  4 Sheets-Sheet 2

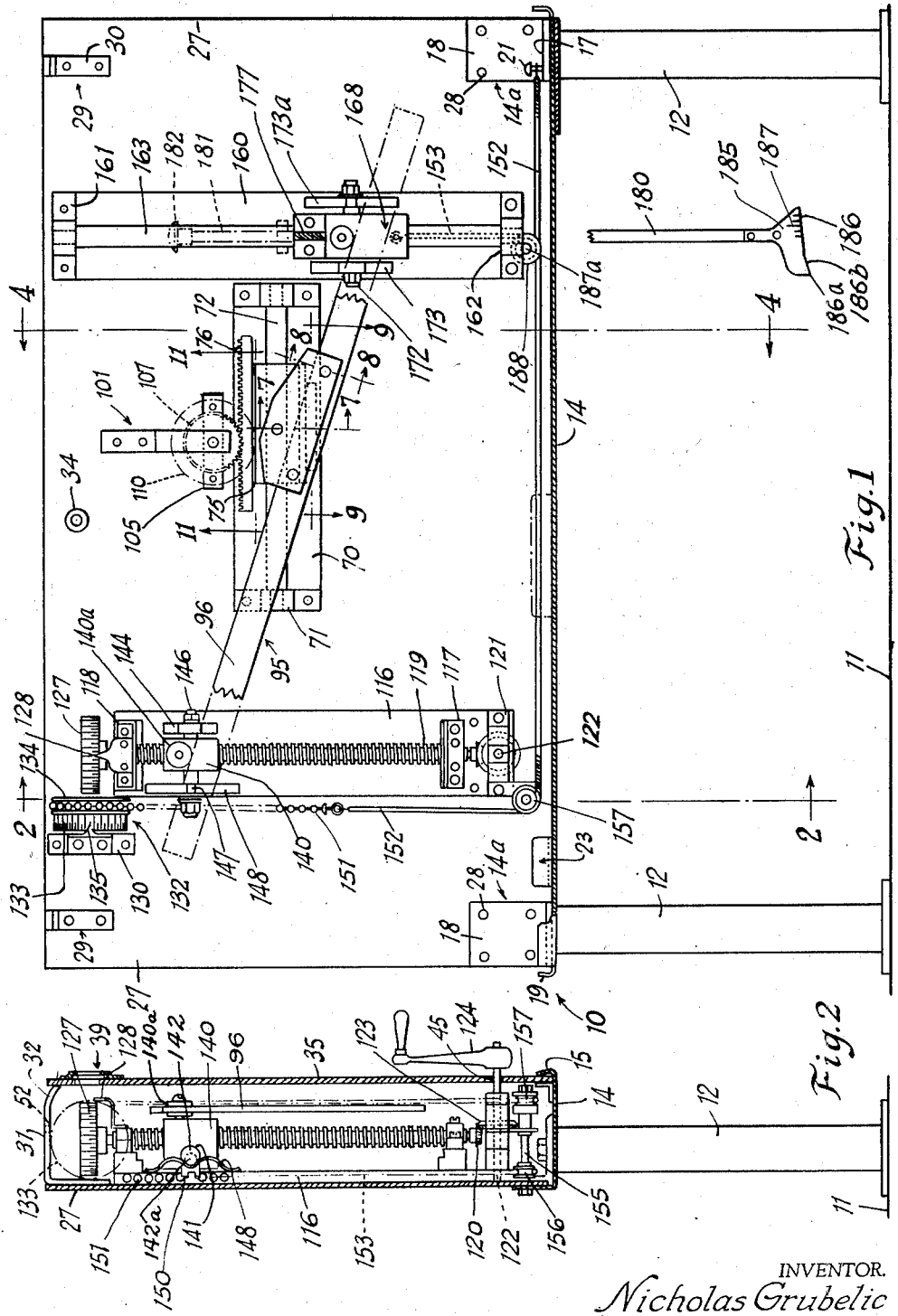

INVENTOR.
Nicholas Grubelic
BY J. B. Felshin
ATTORNEY.

Aug. 7, 1951
N. GRUBELIC
2,563,601
FLUID MEASURING DEVICE
Filed July 21, 1945
4 Sheets-Sheet 3
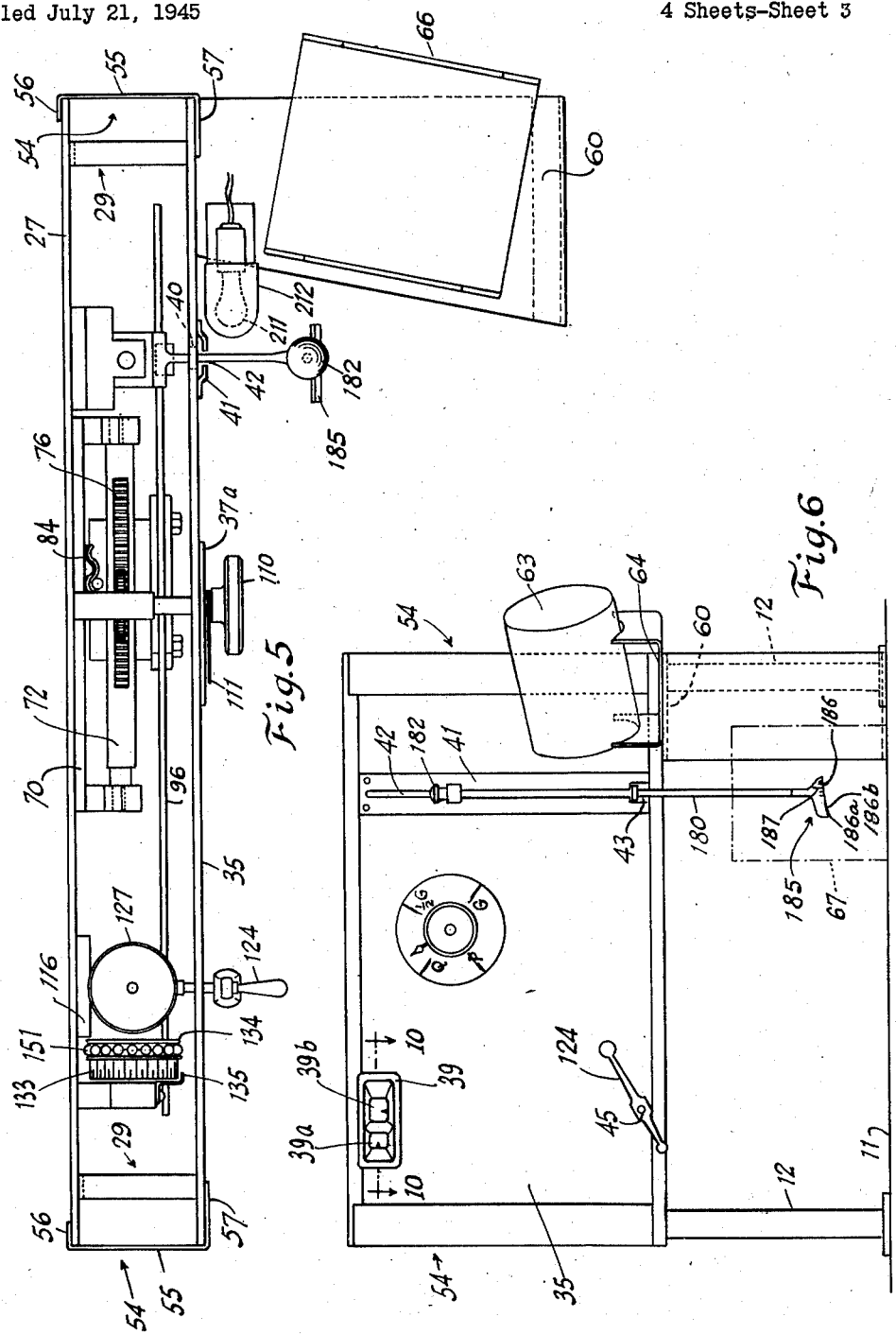
INVENTOR.
Nicholas Grubelic
BY
J.B. Felshin
ATTORNEY.

Aug. 7, 1951  N. GRUBELIC  2,563,601
FLUID MEASURING DEVICE
Filed July 21, 1945  4 Sheets-Sheet 4

Nicholas Grubelic
INVENTOR
BY
J. B. Felshin
ATTORNEY

Patented Aug. 7, 1951

2,563,601

UNITED STATES PATENT OFFICE 2,563,601

FLUID MEASURING DEVICE

Nicholas Grubelic, East Farmingdale, N. Y., assignor of thirty-three and one-third per cent to Israel Kushner, Great Neck, N. Y.

Application July 21, 1945, Serial No. 606,354

8 Claims. (Cl. 33—126.7)

1

This invention relates to fluid measuring devices. It is particularly directed to a machine for measuring quantities of different liquids such as basic color paints or the like material poured into a receptacle in order to obtain a desired proportion of said liquids.

An object of this invention is to generally improve the machine disclosed in my Patent No. 2,354,259, issued July 24, 1944, for Machines for Proportioning and Measuring Paints.

One use of the device disclosed herein is to properly proportion basic color paints in a receptacle to obtain a desired mixture. For this purpose a vertical rod projects downwardly into the receptacle to receive the basic color paints. The rod is first raised to a measured height and the first basic color paint is poured into the receptacle until it reaches a base mark at the lower end of the rod. The rod is then raised to another measured height, and a second basic color paint is poured into the receptacle until the level in the receptacle reaches said base mark, and so on, until the total quantity of paint in the receptacle is at a predetermined height. The formulas for proportioning basic color paints to obtain any desired color, as a result of a mixture, are provided by paint companies. The formula may be given in ounces and sixteenths of an ounce for each basic color, the total for all the basic colors to be mixed for producing a given color being thirty-two ounces.

The machine disclosed herein comprises a lever pivoted on an intermediate movable fulcrum, one arm of the lever being arranged to raise the measuring rod, and the other arm of the lever being engaged by means for depressing said arm predetermined measured distances corresponding to a given formula. The shifting of the fulcrum varies the ratio of the movement of the rod for a given movement of the depressing means. With such arrangement, the fulcrum may be shifted so that by operating the depressing means for a given formula, the rod will be raised proportionate heights corresponding to the total height of the mixture in the receptacle receiving the mixed paints.

Another object of this invention is to provide means for shifting the fulcrum of the lever, including a rotary dial journalled in a casing provided for the machine, and operatively connected to the fulcrum.

Another object of this invention is to provide an improved depressing means for one arm of the lever, including a pair of rotary dials, one for measuring units of movement or weight, such as ounces and the other measuring sub-divisions of said units, thereby eliminating necessity for sliding or longitudinal dials, as shown in applicant's Patent No. 2,354,259.

2

Another object of this invention is to provide a strong, rugged and durable machine of the character described which shall be relatively inexpensive to manufacture, easy to manipulate, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

In the accompanying drawings in which is shown one of the various possible illustrative embodiments of this invention, Fig. 1 is a front elevational view of a machine embodying the invention with the front side and top walls of the casing removed;

Fig. 2 is a cross-sectional view taken on line 2—2 of Fig. 1, with the casing fully enclosed;

Fig. 5 is a top plan view of the machine with the top wall of the casing removed;

Fig. 6 is a front elevational view of the machine with the casing closed;

Figure 4:
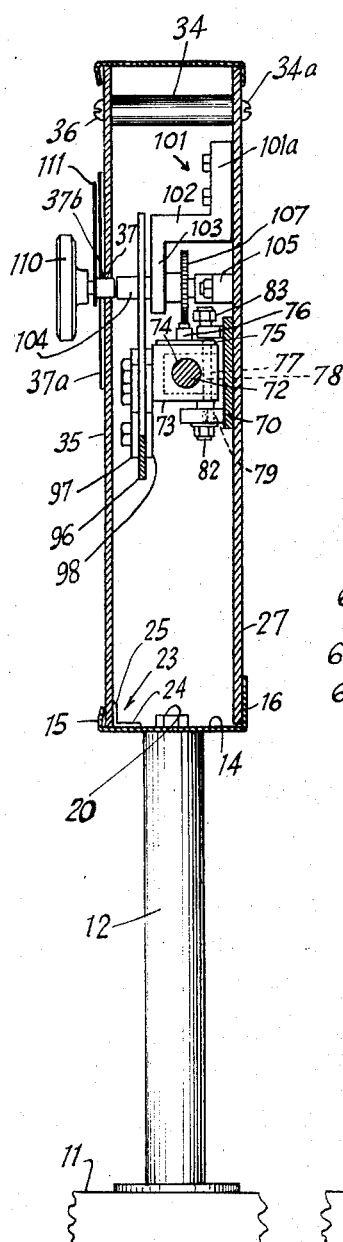
Fig. 4 is a cross-sectional view taken on line 4—4 of Fig. 1, with the casing enclosed.
Figure 3:
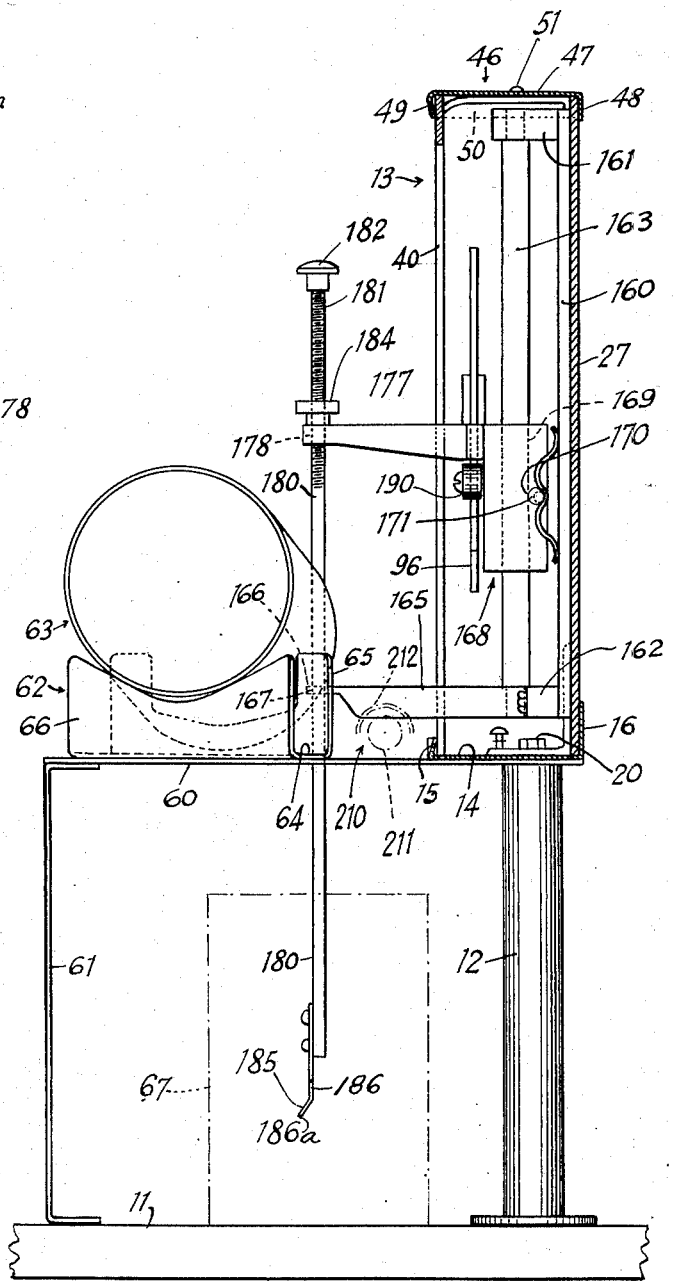
Fig. 3 is a side elevational view of the machine with the adjacent end wall of the machine removed.
Figure 7:
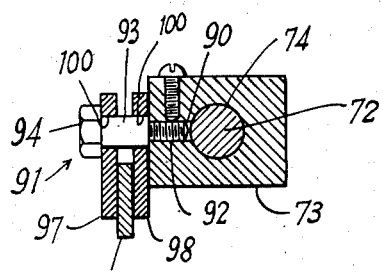
Fig. 7 is a cross-sectional view taken on line 7—7 of Fig. 1.
Figure 8:
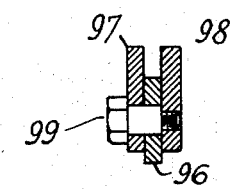
Fig. 8 is a partial cross-sectional view taken on line 8—8 of Fig. 1.
Figure 9:
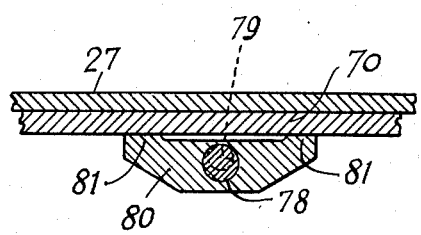
Fig. 9 is a cross-sectional view taken on line 9—9 of Fig. 1.
Figure 10:
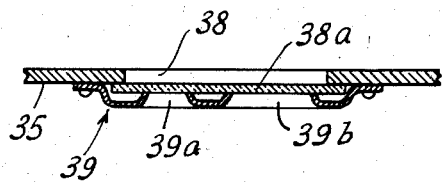
Fig. 10 is a cross-sectional view taken on line 10—10 of Fig. 6.

Referring now in detail to the drawing, 10 designates a machine embodying the invention. The same comprises a horizontal platform 11 on which are mounted a pair of upstanding vertical tubular posts 12. Mounted on the posts 12 is a casing 13. The casing 13 comprises a bottom wall 14 from which there extends upwardly a front flange 15, a rear flange 16 and end flanges 19. On the bottom wall 14 and over the posts 12 are a pair of angle irons 14a, each comprising a forwardly extending horizontal wall 17 and an upstanding vertical wall 18. The bottom walls 17 contact the bottom wall 14. Vertical walls 18 are parallel to and spaced forwardly of the rear flange 16 of the bottom wall. The bottom flanges 17 are fixed to the platform 11 by means of bolts 20 passing through tubes 12 and fixed to the platform in any suitable manner. On wall 17, at one end of the casing is an upstanding pin 21 for the purpose hereinafter appearing.

Fixed to bottom wall 14 adjacent the front flange 15 thereof, are a plurality of spaced angle brackets 23 each comprising a bottom wall 24 and an upstanding lip 25 spaced somewhat from said front flange. Mounted on bottom wall 14 and contacting the rear surfaces of walls 18 is a vertical back wall 27 for the casing 13. The lower edge of the back wall is received between walls 18 and flange 16. The back wall is fixed to walls 18 by means of bolts 28 passing through suitable openings in walls 18 and said back wall. The back wall 27 is rectangular as shown in the drawing.

Attached to the rear wall 27, adjacent the upper end of the latter, are a pair of angle brackets 29 each comprising a downwardly extending vertical wall 30 and a forwardly extending horizontal wall 31. Walls 29 may be fixed to wall 27 by bolts or any other suitable means. The forward ends 32 of arms 31 may be bent down somewhat. Fixed to the back wall 27 is a horizontal spacer rod 34. Spacer rod 34 may be screw threaded at opposite ends. It may be fixed to the back wall by means of a screw 34a passing through an opening in the back wall and screwed in to the rear end of said rod.

The casing 13 is provided with a removable front wall 35, the lower edge of which is received between flange 15 and lips 25. Said front wall is formed with an opening to receive a screw 36 screwed in to the front end of the spacing rod 34. Said front wall 35 is provided with an opening 37 located substantially centrally of the front wall and somewhat above the center of the latter. Attached to the front wall is a dial plate 37a co-axial with opening 37. The dial plate 37a has an opening 37b registering with the opening 37.

Said front wall 35 is furthermore formed with a window opening 38 adjacent its upper left hand corner. Attached to the front face of front wall 35 is a frame 39c formed with a pair of window openings 39a and 39b registering with the opening 38 for the purpose hereinafter appearing. A pane 38a may be interposed between frame 39 and said front wall.

Said front wall is also formed with a slot 40 extending from the lower end thereof upwardly and terminating short of the upper end of said front wall. Attached to the front surface of the front wall is a slotted guide plate 41 provided with a longitudinal slot 42 registering with slot 40. Plate 41 is also open at its lower end. Plate 41 is provided with an enlarged notch 43 at its lower end registering with an enlarged slot portion at the lower end of slot 40. The front wall 35 is also formed, adjacent its lower left hand corner, with a through opening 45 for the purpose hereinafter appearing. It will now be understood that the upper end of the front wall contacts the front edges of the arms 31.

Fitted over the top of the casing is a top cover member 46. Said top cover member comprises a top wall 47 provided at the rear thereof, with a downwardly extending flange 48 fitted over the rear surface of back wall 27. Extending downwardly from the front of top wall 47 is a lip 49 engaging the front face of front wall 35. Said top wall is furthermore formed at the ends thereof with downwardly extending lips 50. The top wall may be screwed to the arms 31 by screws 51 extending through screw threaded openings 52 in said arms and through openings in the top wall registering therewith.

At the sides of the casing are side members 54. Each of the side members 54 comprises a side wall 55, a rear wall 56 contacting the rear surface of back wall 27, and a front wall 57 contacting the front surface of front wall 35. The side members engage the lips on the bottom wall 14 at their lower ends, and the downwardly extending lips or flanges of the top member 46, at their upper ends.

Attached to the underside of bottom wall 14 at the right hand end of the casing is a horizontal plate 60 projecting forwardly of the casing 13. The forward end of plate 60 is supported by a vertical post 61, the lower end whereof rests on platform 11.

On plate 60 is a U-shaped bracket 62 for supporting a receptacle 63 such as a valved paint can or like receptacle described in said Patent No. 2,354,259, or in my co-pending application Serial No. 606,353, filed on even date herewith, for Dispensing Head. Bracket 62 comprises a bottom wall 64, and a pair of upstanding walls 65 and 66. Walls 65 and 66 are substantially parallel to each other but inclined to the casing. Walls 65, 66 are notched to support the can or receptacle 63. Wall 66 is higher than wall 65 so that the can 63 will be inclined downwardly and toward the casing. Paint or other liquid will flow from can 63 to a receptacle 67 mounted on the platform 11. The receptacle 63 is for a basic color paint. After the proper amount of paint is dispensed from can 63 into the receptacle 67, as measured by mechanism to be described hereinafter, the can 63 is replaced by another can containing another basic color paint or other material, so that a measured amount from the latter may be poured into the receptacle 67.

Means is provided to measure the amount of basic color paint or other material from the receptacle 63 to be poured into receptacle 67. To this end there is fixed to the inner surface of back wall 27, a plate 70. At the ends of plate 70 are a pair of horizontally aligned brackets formed with openings 71 supporting a horizontal fixed shaft 72, parallel to the back wall. Slidably mounted on shaft 72 is a block 73 provided with a horizontal through opening 74 for receiving said shaft. Fixed to the top of block 73 is a plate 75 carrying a longitudinal, horizontal rack 76 having upwardly projecting gear teeth.

Adjustable means is provided to retain the block in proper angular position about the axis of shaft 72 as it is moved on said shaft. To this end, said block 73 is formed with a vertical through opening 77 disposed between bore 74 and the back plate 70. Extending through the opening 77 is a vertical shaft 78 frictionally set in any desired angular position and formed with an eccentric portion 79 at one end. On eccentric portion 79 is a block 80 having a pair of spaced feet 81 contacting the back plate 70. Block 80 is retained on shaft portion 79 by a nut 82. At the upper end of shaft 78 is a nut 83. Interposed between the shaft and the back plate 70, and disposed above block 73 and below the nut 83, is a spring 84 adapted to push the upper end of shaft 78 away from the back plate, thereby maintaining the feet 81 of block 80 in contact with plate 70. By rotating the shaft 78, the angle of block 73 may be properly adjusted so that the front face thereof will be maintained in a vertical plane.

The spring 84 may be a double-leaf spring and has a central substantially semi-circular portion 85 engaging shaft 78 and wings 86 contacting plate 70.

Block 73 is formed with a horizontal screw threaded opening 90 extending to its front face. Screwed into said screw threaded opening is a pivot pin 91. Pivot pin 91 has a threaded stem 92 screwed into the threaded opening 90. Extending from the threaded stem 92 is a pivot portion 93. At the front end of portion 93 is a head 94. Pivotally mounted on pin 91 is a lever 95. The lever 95 comprises an elongated bar 96. At opposite sides of bar 96 are a pair of plates 97 and 98. Plates 97 and 98 are fixed to opposite sides of bar 96 by means of headed pins 99. Each pin 99 extends through registering openings in plate 97 and bar 96, and has a screw threaded portion screwed into a screw threaded opening of plate 98.

The plates 97 and 98 extend above the bar 96 and are formed with through openings 100 receiving portion 93 of pin 91. The lever 95 is thus pivoted to pin 91 of block 73. Said pivot pin 93 thus forms the fulcrum for the lever, and said fulcrum may be shifted to the right or left by moving the block along shaft 72.

Means is provided for shifting the fulcrum of the lever. To this end there is fixed to back wall 27 at a point above plate 70, a Z-shaped bracket 101. Z-shaped bracket 101 has an upwardly extending vertical arm 101a contacting the inner surface of back plate 27 and fixed thereto by bolts, screws or any other suitable manner. Extending forwardly from arm 101a is an intermediate horizontal portion 102. Extending downwardly from the forward end of said intermediate portion 102 is an arm 103 formed with a bearing opening in which is journalled a horizontal shaft 104. The rear end of shaft 104 is journalled in a block 105 fixed to the inner surface of back wall 27 and disposed rearwardly of said arm 103. Fixed on shaft 104 is a pinion 107 meshing with the rack 76. Shaft 104 passes through said openings 37, 37b. Fixed to the forward end of the shaft 104 is a handle 110. On said shaft and contacting the dial plate 37a is a dial pointer 111. The dial pointer is mounted for rotation with shaft 104 in any suitable manner. It will now be understood that upon rotating the handle 110, the fulcrum for the lever will be shifted. The amount of shift is indicated on dial 37a which may be properly scaled for that purpose.

Means is provided to swing the lever about its fulcrum for measured distances. To this end there is fixed to the back plate 27 of the casing 115, a flat bar 116. Fixed to the bar 116 above its lower end is a bearing block 117 formed with a vertical bearing. Fixed to the upper end of bar 116 is a bearing block 118. Supported on the bearings 117 and 118 is a vertical feed screw 119. The feed screw 119 is formed with a stud end extending below bearing 117, and fixed to the lower end of said screw is a beveled gear 120. Attached to the lower end of bar 116 is a cage 121 supporting a horizontal shaft 122 extending from front to rear. On the shaft is a beveled gear 123 similar to and meshing with gear 120. Shaft 122 projects forwardly through opening 45 in the front wall 35. Fixed to the front end of said shaft, and disposed in front of the casing, is a handle 124. It will now be understood that upon rotating handle 124, the feed screw 119 will be rotated.

At the upper end of the feed screw 119, and disposed above the bearing block is a dial or scaled wheel 127 which may be seen through window 39b. Fixed to the bearing block 118 is a pointer 128 overlapping the dial 127. The dial 127 rotates about a vertical axis as shown in the drawing. Upon turning the handle 124, the dial 127 also turns through equal angle of rotation. Said dial may be marked off into 32 parts. Each part may designate one thirty-second of an ounce.

Fixed to the back plate 27 is a bracket 130. Fixed to the bracket is a horizontal shaft on which is rotatably mounted a dial wheel 132. The dial wheel 132 has a dial portion 133. It is also formed with a grooved pulley portion 134. It will be noted that the dial wheel 133 rotates about a horizontal axis. Fixed to bracket 130 is a pointer 135 overlapping the portion 133. The pointers and a portion of the dial may be seen through the window opening 39a. The dial 132 may be seen through the window opening 39a. The dial 132 may be marked off into thirty-two parts or units to designate thirty-two ounces. The axis of dial 132 is at the level of the dial 127.

Figure 11:
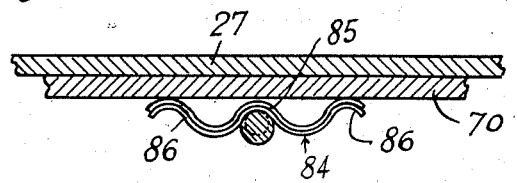
Fig. 11 is a cross-sectional view taken on line 11—11 of Fig. 1.

Means is provided to rotate the dial 132 once for each thirty-two revolutions of the dial 127, or to put it another way, to rotate the dial 132 through one thirty-second of a revolution for each complete revolution of dial 127. To this end there is mounted on screw 119, a travelling nut 140 engaging the threads of said screw. On nut 140 is a horizontal forwardly projecting pin 140a contacting the upper edge of lever bar 96. The nut 140 comprises a block, and the latter is formed with a horizontal through opening 141 disposed between the screw 119 and bar 116. Extending through said opening 141 is a shaft 142. Said shaft is formed with an eccentric end portion 142a at one end. Received on said eccentric portion is a block 144 similar to the block 80 and contacting the front surface of bar 116. Block 144 is retained on the shaft by a nut 146. Interposed between the opposite end 147 of said shaft and bar 116 is a spring 148 adapted to press said end of said shaft away from said bar. The spring 148 is constructed like spring 86, except that a single spring may be employed instead of a double spring as shown in Fig. 11. By turning shaft 142, nut 140 may be adjusted to cause the front wall thereof to be parallel to the wall 27.

On shaft 142 is a rearwardly extending clip 150. Connected to said clip 150 is a ball chain 151 which extends over the groove pulley 134 for the purpose hereinafter appearing. Connected to the one end of the ball chain 151 is a coil spring 152. Connected to the other end of the ball chain is a coil spring 153. Fixed to the back wall 27 and disposed below the lower end of bar 116 and at the left side thereof, is a fixed shaft 155 carrying a pair of grooved collars 156 and 157. The coil spring 152 extends about collar 157. The coil spring 153 extends around grooved collar 156. The coil spring 152 extends horizontally above the bottom wall 14 and one end thereof is attached to pin 21. Coil spring 153 is hooked up in the manner hereinafter to be described.

It will now be understood that upon rotating handle 124, dial 127 will be rotated. The threads of screw 119 are so selected as to move the nut 140 upwardly a sufficient distance to rotate dial 133 through chain 151, one division or one thirty-second of a revolution for each complete revolution of dial 127. Since the travelling nut 140 is connected to the ball chain 151 which is threaded over the pulley 134, dial 132 will be rotated upon rotating handle 124.

Means is provided for measuring heights of level of paint or other liquid poured into receptacle 67 corresponding to degree of rotation of handle 124. To this end there is fixed to the rear wall 27, a vertical bar 160. At the upper end of bar 160 is a bearing block 161. At the lower end of said bar 160 is a block 162. The blocks 161 and 162 are formed with aligned openings to receive the ends of a vertical, fixed shaft 163. The lower block 162 is formed with a forwardly projecting fixed arm 165 passing through notch 43 in the lower end of the slot 40. At the forward end of arm 165 is a finger 166 formed with a through guide opening 167 for the purpose hereinafter appearing. Slidably mounted on the fixed shaft 163 is a travelling head 168. The head 168 is formed with a vertical through opening 169 receiving said shaft 163.

The head 168 is furthermore formed with a horizontal through opening 170 receiving a horizontal shaft 171 disposed between shaft 163 and bar 160. One end 172 of shaft 171 is eccentric and receives a block 173 similar to block 144 and contacting bar 160. Interposed between the opposite end of the shaft 171 and bar 160 is a spring 173a similar to spring 84, tending to rotate the head 168. Upon rotating shaft 172, the front face of the head 168 may be made parallel to the back plate 27 of the casing. Extending forwardly from the head 168 is an arm 177 formed with a through opening 178 at its forward end aligned with the through opening 167 of the arm 165. Extending through the openings 167 and 178 is a measuring rod 180. Rod 180 has a screw threaded portion 181 adjacent its upper end. At the upper end of the rod is a head 182. Screwed onto the threaded portion 181 is a collar 184 adapted to contact the upper side of arm 177. Upon rotating collar 184, rod 180 is either raised or lowered depending upon the direction of rotation. The lower end of the rod is adapted to project down into the receptacle 67.

Fixed to the lower end of the rod is an indicator plate 185. Plate 185 has an upwardly and sharply inclined lower edge 186b and an upwardly lesser inclined lower edge 186 and is provided with markings including a base mark 187 extending to said lower edge 186. Lower edge 186b forms an acute point with one side of plate 185 as at 186a.

Adjacent the lower end of the bar 160 is a fixed shaft 187a. On said shaft is a grooved collar 188. The coil 153 passes around collar 188, extends upwardly, and is fixed to the head 168. On head 168 is a pin 190 adapted to contact the upper edge of lever bar 96. It will now be understood that the spring 153 pulls the head 168 downwardly so that pin 190 contacts the upper edge of lever bar 96 and thereby retains the lever bar in engagement with pin 140a.

The operation of the machine will now be described:

Let us assume that a manufacturer's formula gives quantities for a certain grey color to be as follows:

|  | Amounts of each color | Scale setting |
| --- | --- | --- |
|  | Ounces |  |
| White | 12¾₆ | 12¾₆ |
| Black | 10½ | 22¹¼₆ |
| Yellow | 4¾ | 27⁷⁄₁₆ |
| Blue | 4⁹⁄₁₆ | 32 |

Let us assume that one quart of paint is to be mixed in a quart can 67. The handle 110 is then rotated to bring the pointer 111 to a point on the dial 37a which indicates that a full quart of paint is to be mixed in a quart receptacle. Such a quart receptacle is of a predetermined height, that is four and one-half inches. In the location of the fulcrum, when the dial is so set, rod 180 will move upwardly four and one-half inches upon rotating dial 133 through a complete revolution or thirty-two ounces. The handle 124 is then rotated to bring the dials 127 and 133 to 0—0. A quart can 67 is placed on the platform 11 so that the rod 180 projects into said receptacle. Enough thinner is put into the receptacle to cover the bottom thereof. The rod 180 is then adjusted by turning the collar 184 until the base mark 187 is at the upper level of the thinner. The difference in height between the base mark and point 186a is substantially the height of the thinner in the can. A can of paint 63 containing basic white paint is then put on the bracket 62. The valve on the can 63 is closed. Handle 124 is then rotated until dial 133 registers 12 and dial 127 registers ₁³⁄₁₆ or ⁶⁄₃₂. The valve on the can 63 is then opened so that paint will pour into the receptacle 67. When paint reaches the level of the base mark 187 the valve is shut. The can 63 is then removed and another can containing black paint is placed on the bracket. Handle 124 is then rotated until dial 133 reaches 22 and dial 127 reaches ¹¹⁄₁₆ or ²²⁄₃₂. During this operation, rod 180 is raised to a new level. The valve on the can of black paint is then opened and the paint pours into a receptacle 67 again to the level of the base mark 187. The valve of the paint can is then shut. The paint can is removed and is replaced by a can of yellow paint. Handle 124 is again rotated until dial 133 reaches unit 27 and dial 127 reaches ⁷⁄₁₆ or ¹⁴⁄₃₂. The valve on the can of yellow paint is then opened and paint pours into the receptacle 67 to the base mark 187 at which time the valve on the paint can is shut. The paint can is then replaced by a can of blue paint and handle 124 is rotated until the dials 133 and 127 read 32 and 0, respectively. The base mark 187 will then have risen the full 4½ inches. The blue paint is then allowed to pour into the receptacle 67 until it reaches the base mark. The receptacle 67 then contains the proper mixture of paints to produce the desired grey color.

A gallon can is 7 inches in height and therefore if it is desired to fill a gallon can of mixed paints, the dial point 111 must be moved to a position where movement of the dials 133, 127 from 0—0, respectively to 32—0, respectively, will cause rod 138 to be lifted a full 7 inches. Thus the dial 37a may be marked at points indicating half pint, pint, quart, half gallon and gallon.

If it is desired to mix less than a quart of paint in a quart receptacle, the operator may judge the point at which to set the dial.

Figure 12:
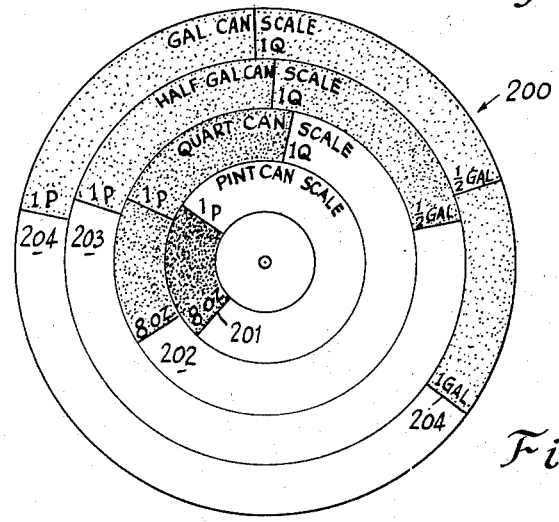
Fig. 12 is a front elevational view of a modified form of dial.

If desired, however, the dial 37a may be replaced by a dial having a plurality of concentric dial portions such as shown in Fig. 12. In Fig. 12 there is shown a dial 200. The same comprises an inner circular pint can scale portion 201. About the latter is an annular gallon can scale portion 204. If it is desired to mix paints in a pint can, scale 201 is used. If it is desired to mix paints in a quart can, scale 202 is used. If it is desired to mix paint in a half gallon can, scale 203 is used. If it is desired to mix paint in a gallon can, scale 204 is used. Each of the scales 201, 202, 203, 204, is marked for the amount of paint to be mixed in the can. Thus, the scale 201 may be marked for full pint and for eight ounces to be mixed in a pint can. Thus if it is desired to mix eight ounces of paint in a pint receptacle, the pointer is moved to the eight ounce mark on scale 201.

Means is provided to illuminate the inside of the receptacle 67 so that the level of paint or other material therein may be seen relative to the base mark 187. To this end there is mounted on plate 60 an electric lamp 210. The lamp may be fastened to plates 60 in any suitable manner and comprise a light bulb 211 with a reflector 212 over the light bulb. The bulb projects beyond the inner edge 60a of plate 60 and is disposed above the receptacle 67. The reflector thus reflects light rays downwardly into the receptacle.

Although the dials 133 and 127 have been described as being scaled for ounces and 1/16 or 1/32 of an ounce, it will be understood that dial 134 may be scaled for 10 or 100 units and scale 127 scaled for tenths and hundreds of a unit, respectively. In such event the pitch of screw 119 would be such that one revolution of scale 127 would cause scale 134 to move either a tenth or one hundredth of a revolution. The scales may be directly marked on the dial wheels or may be marked on sleeves or rings fitted onto the dial wheel so as to be replaceable.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. In a measuring machine, a lever pivoted in a horizontal pivot, a vertically slidable measuring rod adapted to be inserted into a receptacle, a slidable member adapted to lift said rod, said lever having one arm adapted to lift said member, and means for rotating said lever, said means comprising a rotatably and non-slidably mounted screw, a travelling nut on said screw, means for rotating said screw, a rotary dial fixed on said screw for rotation therewith, a second dial rotatably mounted for movement about an axis perpendicular to the axis of said screw, a flexible element adapted to rotate the second dial, and means to connect the nut to said element and resilient means connecting one end of said element to said member, whereby said member is urged into contact with said lever arm.

2. In a measuring machine, a lever pivoted in a horizontal pivot, a vertically slidable measuring rod adapted to be inserted into a receptacle, a slidable member adapted to lift said rod, said lever having one arm adapted to lift said member, and means for rotating said lever, said means comprising a rotatably and non-slidably mounted screw, a travelling nut on said screw, means for rotating said screw, a rotary dial fixed on said screw for rotation therewith, a second dial rotatably mounted for movement about an axis perpendicular to the axis of said screw, a flexible element adapted to rotate the second dial, and means to connect the nut to said element and resilient means to connect one end of said element to said member, said resilient means being adapted to urge said member into contact with said lever arm and means to resiliently anchor the other end of said element.

3. In a measuring machine, a slidably mounted member, a lever pivoted mediately the ends thereof to said sliding member, a vertical rod, vertically slidable means adapted to lift said rod, means on said vertically slidable means resting on one arm of said lever, means to depress the other arm of said lever, including a vertical screw, means to rotate said screw, a travelling nut on said screw, means on the travelling nut engaging an upper edge of said rod, and a dial on said screw and a second dial mounted for rotating about an axis perpendicular to the axis of said screw, and means connected to said nut for rotating said second dial and means to rotate said nut about the axis of said screw for adjusting the position of said nut.

4. In a machine of the character described, a casing having a back wall, a horizontal shaft supported on said back wall, a block slidably mounted on said horizontal shaft, a rack on said block, said casing having a front wall, a horizontal shaft passing through said front wall, a pinion on said second shaft meshing with said rack, a lever pivoted on said block, a measuring rod, means on said lever to lift said rod, and means for manually swinging said lever, said last means comprising a screw and a travelling nut, and means for rotating said travelling nut about the axis of the screw for adjusting the position thereof.

5. In a machine of the character described, a casing having a back wall, a horizontal shaft supported on said back wall, a block slidably mounted on said horizontal shaft, a rack on said block, said casing having a front wall, a horizontal shaft passing through said front wall, a pinion on said second shaft meshing with said rack, a lever pivoted on said block, a measuring rod, means on said lever to lift said rod, and means for manually swinging said lever, and means for rotating said block about the axis of said first shaft for adjusting the position thereof.

6. In a machine of the character described, a casing having a back wall, a horizontal shaft supported on said back wall, a block slidably mounted on said horizontal shaft, a rack on said block, said casing having a front wall, a horizontal shaft passing through said front wall, a pinion on said second shaft meshing with said rack, a lever pivoted on said block, a measuring rod, means on said lever to lift said rod, and means for manually swinging said lever, and means for rotating said block about the axis of said first shaft for adjusting the position thereof, the means for raising said rod comprising a vertical shaft fixed to said back wall, a block slidably mounted on said vertical shaft, means on said last block to engage the upper edge of said lever, and means for rotating said last block relative to the axis of said vertical shaft for adjusting the position of said last block.

7. In a machine of the character described, a casing having a back wall, a horizontal shaft supported on said back wall, a block slidably mounted on said horizontal shaft, a rack on said block, said casing having a front wall, a horizontal shaft passing through said front wall, a pinion on said second shaft meshing with said rack, a lever pivoted on said block, a measuring rod, means on said lever to lift said rod, and means for manually swinging said lever, and means for rotating said block about the axis of said first shaft for adjusting the position thereof, the means for raising said rod comprising a vertical shaft fixed to said back wall, a block slidably mounted on said vertical shaft, means on said last block to engage the upper edge of said lever, and means for rotating said last block relative to the axis of said vertical shaft for adjusting the position of said last block, the means for swinging said lever comprising a vertical screw, a travelling nut on said screw and slidable relative to said back wall, and means for rotating said nut relative to the axis of said screw to adjust its angular position and a dial on said screw.

8. In a fluid measuring machine, an indicator rod, means to raise the indicator rod predetermined distances, scale means to measure the distance the indicator rod is raised, an indicator plate fixed to the lower end of the rod, said plate having an inclined lower edge, a mark on the plate extending to said edge, and said plate having at one end an inclined edge extending from the first inclined edge and at a greater inclination thereto and terminating in a point at one end of the plate.

NICHOLAS GRUBELIC.

REFERENCES CITED

The following references are of record in the file of this patent:

UNITED STATES PATENTS

| Number | Name | Date |
| --- | --- | --- |
| 607,898 | Todd | July 26, 1898 |
| 1,076,682 | Lucas | Oct. 28, 1913 |
| 2,269,737 | Rogers | Jan. 13, 1942 |
| 2,354,259 | Grubelic | July 25, 1944 |